US008611418B2

(12) United States Patent
Soroushian et al.

(10) Patent No.: US 8,611,418 B2
(45) Date of Patent: Dec. 17, 2013

(54) DECODING A PROGRESSIVE JPEG BITSTREAM AS A SEQUENTIALLY-PREDICTED HYBRID VIDEO BITSTREAM

(75) Inventors: Kourosh Soroushian, San Jose, CA (US); K. Metin Uz, Eden Prairie, MN (US); Satish Vithal Joshi, Cupertino, CA (US)

(73) Assignee: LSI Corporation, San Jose, CA (US)

( * ) Notice: Subject to any disclaimer, the term of this patent is extended or adjusted under 35 U.S.C. 154(b) by 1676 days.

(21) Appl. No.: 11/644,354

(22) Filed: Dec. 22, 2006

(65) Prior Publication Data

US 2008/0130746 A1 Jun. 5, 2008

Related U.S. Application Data

(60) Provisional application No. 60/861,786, filed on Nov. 30, 2006.

(51) Int. Cl.
*H04N 11/02* (2006.01)
(52) U.S. Cl.
USPC ............ 375/240.12; 375/240.03; 375/240.06; 375/240.16; 375/240.27; 382/232; 382/233; 382/236
(58) Field of Classification Search
None
See application file for complete search history.

(56) References Cited

U.S. PATENT DOCUMENTS

| | | | | |
|---|---|---|---|---|
| 5,835,740 | A * | 11/1998 | Wise et al. | 712/200 |
| 6,058,210 | A * | 5/2000 | de Queiroz et al. | 382/232 |
| 6,266,817 | B1 * | 7/2001 | Chaddha | 725/146 |
| 6,989,773 | B2 * | 1/2006 | Wee et al. | 341/51 |
| 7,058,127 | B2 * | 6/2006 | Lu et al. | 375/240.06 |
| 7,123,772 | B2 * | 10/2006 | Estevez et al. | 382/236 |
| 7,254,272 | B2 * | 8/2007 | Mitchell et al. | 382/233 |
| 7,266,148 | B2 * | 9/2007 | Kim | 375/240.03 |
| 7,346,108 | B2 * | 3/2008 | Maeda | 375/240.16 |
| 2002/0064232 | A1 * | 5/2002 | Fukuhara et al. | 375/240.26 |
| 2002/0141653 | A1 * | 10/2002 | Estevez et al. | 382/250 |
| 2002/0191697 | A1 * | 12/2002 | Ohyama et al. | 375/240.11 |
| 2003/0090505 | A1 * | 5/2003 | McGee et al. | 345/721 |
| 2003/0222998 | A1 * | 12/2003 | Yamauchi et al. | 348/262 |
| 2005/0053300 | A1 * | 3/2005 | Mukerjee | 382/239 |
| 2005/0244068 | A1 * | 11/2005 | Nakachi et al. | 382/240 |
| 2005/0265450 | A1 * | 12/2005 | Raveendran et al. | 375/240.15 |
| 2007/0110163 | A1 * | 5/2007 | Kodama | 375/240.21 |
| 2008/0130746 | A1 * | 6/2008 | Soroushian et al. | 375/240.15 |
| 2008/0219571 | A1 * | 9/2008 | Suzuki et al. | 382/236 |

* cited by examiner

*Primary Examiner* — William C Vaughn, Jr.
*Assistant Examiner* — Luis M Perez
(74) *Attorney, Agent, or Firm* — Christopher P. Maiorana, PC (57) ABSTRACT

An apparatus generally including a first circuit and a second circuit is disclosed. The first circuit may be configured to generate an intermediate bitstream by parsing a Joint Picture Expert Group (JPEG) bitstream carrying a picture. The intermediate bitstream generally includes one or more encoded frames each representing a portion of the picture. The second circuit may be configured to (i) generate one or more intermediate images by decoding the encoded frames and (ii) recreate the picture using the intermediate images.

23 Claims, 11 Drawing Sheets

DECODING A PROGRESSIVE JPEG BITSTREAM AS A SEQUENTIALLY-PREDICTED HYBRID VIDEO BITSTREAM

CROSS REFERENCE TO RELATED APPLICATIONS

This application claims the benefit of U.S. Provisional Application No. 60/861,786, filed Nov. 30, 2006, which is hereby incorporated by reference in its entirety.

FIELD OF THE INVENTION

The present invention relates to Joint Picture Experts Group (JPEG) bitstreams generally and, more particularly, to a decoding of a progressive JPEG bitstream as a sequentially-predicted hybrid video bitstream.

BACKGROUND OF THE INVENTION

In the year 1990, the Joint Picture Experts Group (JPEG) ratified a first version of a standard aimed at reducing the storage space needed for digital still pictures, ISO/IEC Standard 10918-1 and ITU-T Recommendation T.81. The JPEG standard started a revolution in the capture and compression of digital images. The capture and compression of digital images enabled and enhanced many categories of products ranging from nonlinear editing stations, digital still-image cameras and portable video recording devices. These products are in part based on the compression technology defined by the JPEG standard.

The JPEG standard defines a series of operating modes and formats. One such format is a progressive stream, where the image is gradually refined to a complete image in many passes. With the propagation of JPEG, support has been needed by a variety of consumer products. One such product is the DVD player/recorder. The DVD player/recorder can decode a variety of motion-video compression standards. However, DVD player/recorders are not well suited for decoding progressive JPEG images. The lack of native support becomes further exemplified as an active push in the digital still camera product domain leads to the generation of larger and more complex JPEG images. Progressive JPEG images consume large amounts of memory in order to store intermediate coefficients and complete the image decoding process. Due to the large amounts of memory stored for progressive JPEG images, conventional systems fail to provide a feasible method for transcoding progressive JPEG bitstreams into an MPEG bitstream.

The general technique of transcoding a compressed bitstream of one format into a compressed bitstream of another format is well understood. For example, U.S. Pat. No. 6,141,447 to Elliot Linzer and Aaron Wells describes such an application. For conventional JPEG to MPEG transcoding, a picture is composed of discrete cosine transform (DCT) blocks. Each DCT block consists of a DC value and a number of runs or level pairs. When the DC value is computed, the corresponding MPEG codeword is computed and placed in the output bitstream. When a run pair codeword is decoded, the corresponding MPEG codeword for the run pair is placed in the output bitstream. The resulting bitstream can be decoded quickly by a system designed for decoding MPEG bitstreams.

Conventional methods do not adequately handle two types of bitstreams. Transcoding very large resolution JPEG images is not practical because most MPEG systems have a limit on image size. For example, a main level, high profile MPEG bitstream is limited to a predefined size. Very large resolution JPEG images generally exceed the predefined size. In addition, progressive JPEG images comprise a bitstream ordered hierarchically in a number of ways. Such hierarchy makes it difficult to transcode progressive JPEG bitstreams into an MPEG bitstream.

It would be desirable to provide a method and/or apparatus that decodes a progressive JPEG bitstream as a sequentially-predicted hybrid video bitstream.

SUMMARY OF THE INVENTION

The present invention concerns an apparatus generally comprising a first circuit and a second circuit. The first circuit may be configured to generate an intermediate bitstream by parsing a Joint Picture Expert Group (JPEG) bitstream carrying a picture. The intermediate bitstream generally includes one or more encoded frames each representing a portion of the picture. The second circuit may be configured to (i) generate one or more intermediate images by decoding the encoded frames and (ii) recreate the picture using the intermediate images.

The objects, features and advantages of the present invention include decoding a progressive JPEG bitstream as a sequentially-predicted hybrid video bitstream that may (i) limit the amount of storage to the physical output size of a video buffer, (ii) accelerate the decoding process and/or (iii) be easy to implement.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
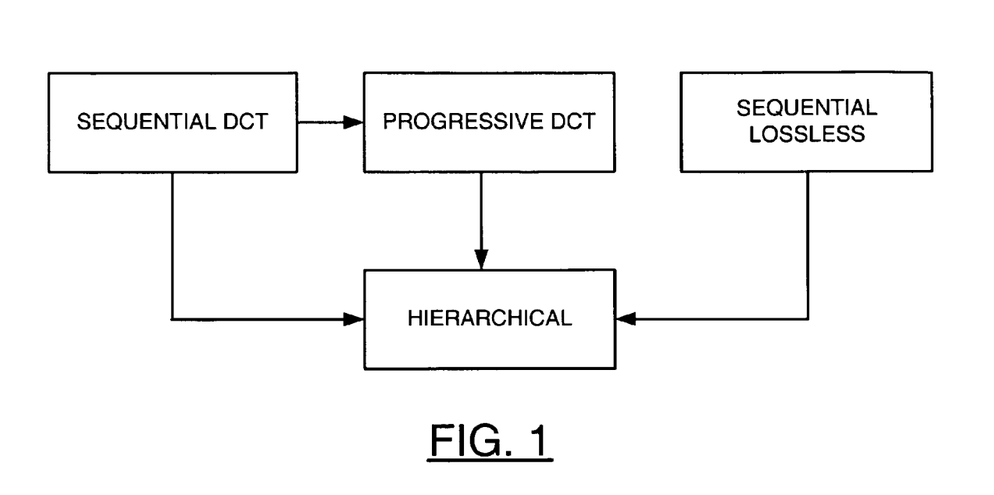
FIG. 1 is a block diagram of various JPEG modes of operation.

Referring to FIG. 1, a block diagram of various Joint Picture Experts Group (JPEG) modes of operation is shown. The JPEG standard may be used to convert analog images into a digital representation. The conversion of an analog picture into digital representation may reduce a storage space criteria. The JPEG standard may provide both lossy compression and lossless compression among multiple modes. For a lossless compression, no degradation in quality may take place. For a lossy compression, little to severe degradation in quality may occur.

In a sequential discrete cosine transform (DCT)-based mode (e.g., a sequential mode), multiple sample blocks (e.g., 8×8 blocks) may be processed, block by block from left to right, and block-row by block-row from top to bottom. Processing each of the blocks generally includes a forward DCT to create coefficients, a quantization of the coefficients and a zig-zag sequencing of the coefficients prior to encoding. The sequential mode may use a simple predictive encoding strategy. The sequential mode may use a Huffman encoding to encode prediction differences in an output bitstream. A sequential decompression may start with entropy decoding followed by a reverse zig-zag sequencing, dequantizing and an inverse DCT.

In a progressive DCT-based mode (e.g., a progressive mode), the blocks may be processed as in the sequential mode. However, after the quantization all of the coefficients from all of the blocks may be buffered simultaneously in a picture-sized memory. The buffered DCT coefficients may be selectively encoded. The encoding may be performed in a sequence of scans through the coefficients. Each of the scans may include a coded subset of the coefficients and/or a subset of the bit-planes of the picture.

In a hierarchical mode a pyramid image may be created. A decoded pyramid image may be displayed at different resolutions or progressively. Each lower resolution image may be used as a prediction for the next higher resolution pyramid level.

In a lossless mode, a predictor generally combines a reconstructed value of up to three neighborhood samples around a particular position to form a prediction at the particular position. The prediction may be subtracted from an actual value of the sample at the particular position to calculate a difference. The difference may be losslessly entropy encoded by either the Huffman encoding or an arithmetic encoding. The JPEG modes (e.g., sequential mode, progressive mode, lossless mode and hierarchical mode) may be used to encode lower resolution images. Each mode of JPEG operation may have a specification and bitstream syntax.

Figure 2:
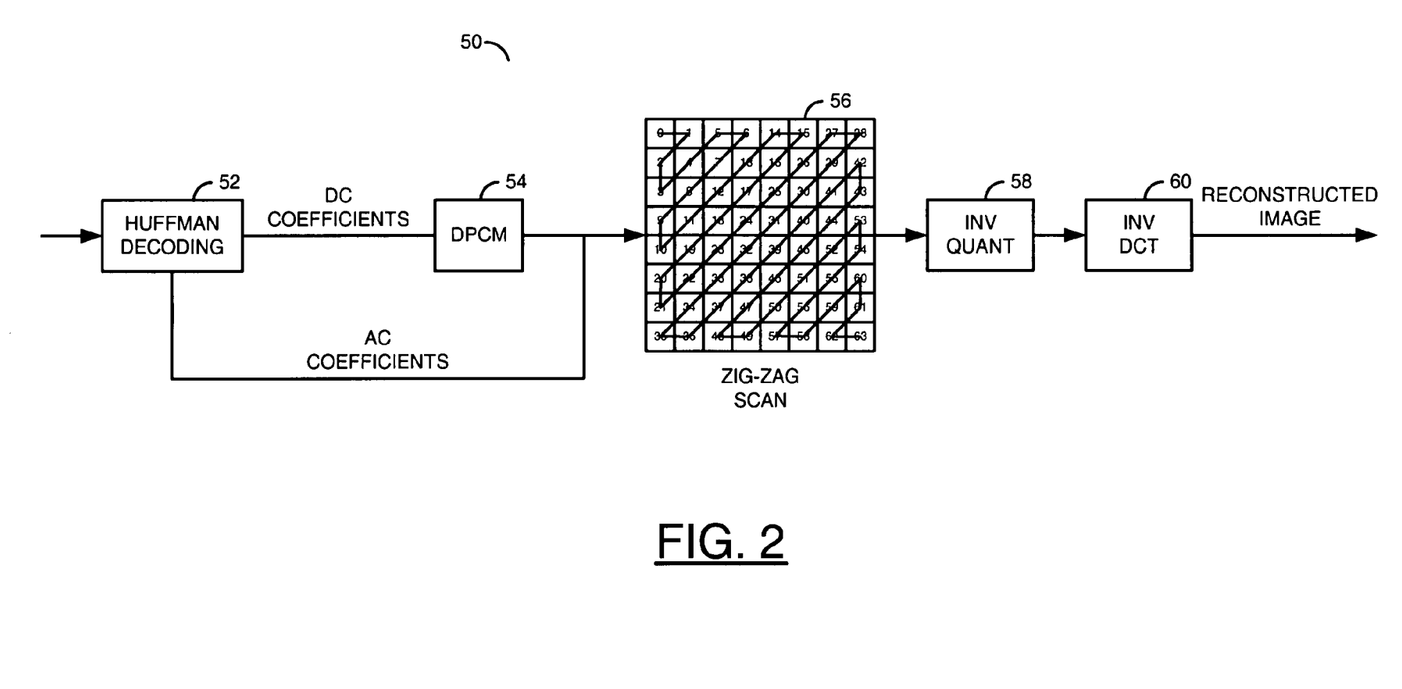
FIG. 2 is a block diagram of a baseline JPEG decoder.

Referring to FIG. 2, a baseline JPEG decoder 50 is shown. The decoder 50 generally comprises a Huffman decoder 52, a differential pulse-code modulation (DPCM) circuit 54, a zig-zag scan circuit 56, an inverse quantization circuit 58 and an inverse discrete cosine transform (IDCT) circuit 60. The Huffman decoder 52 may present a signal (e.g., DC_COEFFICIENTS) to the DPCM circuit 54. The Huffman decoder 52 may present a signal (e.g., AC_COEFFICIENTS) to the zig-zag scan circuit 56. The IDCT circuit 60 may generate a final reconstructed image on a signal (e.g., RECONSTRUCTED_IMAGE). The decoder 50 generally illustrates the minimum capability that may be present in all DCT-based decoder systems.

The Huffman decoder 52 may generate DC and AC coefficient pairs in response to decoding Huffman encoded data. The DPCM circuit 54 may generate a digital sample of the DC coefficients. The DPCM circuit 54 may determine the difference between an actual sample value and a predicted value (e.g., predicted value based on previous sample or samples).

Figure 3:
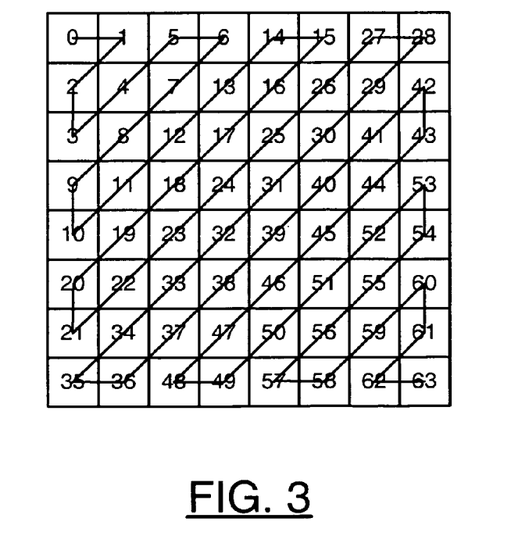
FIG. 3 is a diagram of a zig-zag scan circuit.

The zig-zag scan circuit 56 may map the decoded coefficients (e.g., a DC term followed by 63 AC terms) from one matrix representation to another. FIG. 3 generally illustrates the order of mapping decoded coefficients. The inverse quantization circuit 58 may dequantize the DC coefficients and the AC coefficients by using corresponding coefficients in a quantization table. The IDCT circuit 60 may apply the last transformation on the DC coefficients and the AC coefficients to generate the reconstructed image (or decompressed pixel data). The system 50 generally represents a minimum capability that may be present in all DCT-based decoder systems.

The functions performed by the IDCT circuit 60 may be expressed in equations 1 and 2 as follows:

$$f(i, j) = \frac{1}{4} \sum_{u=0}^{7} \sum_{v=0}^{7} C(u) \cdot C(v) \cdot \cos\frac{(2i+1) \cdot u\pi}{16} \cdot \cos\frac{(2j+1) \cdot v\pi}{16} \cdot F(u, v) \quad \text{Eq. 1}$$

$$C(x) = \begin{cases} \frac{1}{\sqrt{2}} & \text{for } (x = 0) \\ 1 & \text{for } (x > 0) \end{cases} \quad \text{Eq. 2}$$

A sequential DCT-based decoder may compress all image components individually or in groups. A component or group of components may be completely represented in a single scan or pass. All information for decoding a picture may be available with a single scan of the JPEG file. The progressive JPEG stream may be sent as multiple scans (or bands) spanning both the bit-planes and coefficient zones.

Figure 4:
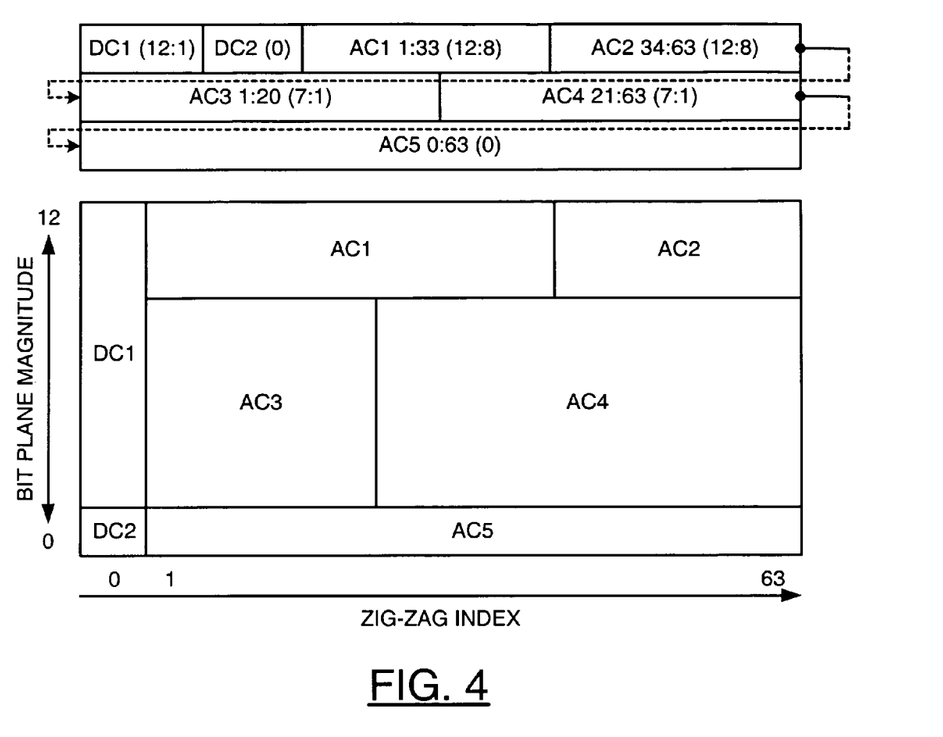
FIG. 4 is a diagram of a final coefficient map for a progressive mode JPEG picture.

Referring to FIG. 4, a block diagram of a final coefficient map for a progressive JPEG picture is shown. Both the DC coefficients and the AC coefficients may be transmitted in terms of bit-planes. The AC coefficients may be sent as a combination of separate zig-zag index ranges and separate bit-plane ranges for the AC coefficients. A total of 7 transfers (e.g., DC1, DC2, AC1, AC2, AC3, AC4, and AC5) may be created. The transfer DC1 may transmit the most significant 12 bits of the index 0 (e.g., DC) coefficients. The transfer DC2 may carry the least significant bit of the index 0 coefficients. The transfer DC2 may be followed by the AC coefficient bands (e.g., AC1-AC5). The transfers AC1-AC5 may cover both the bit-plane and the coefficient plane.

In a baseline JPEG decoder, a final coefficient matrix may be built after a successive reconstruction of the entire coefficient map. A picture may not be completely decoded until (i) the entire coefficient scan has finished, (ii) all of the coefficient data has been received and (iii) all of the coefficient data are fully incorporated in creating the final coefficient map.

Building up the coefficients may generate issues with very large progressive mode JPEG pictures. Large progressive mode JPEG pictures may utilize a vast amount of memory to store the coefficients and complete the picture decoding process. Conventional methods do not adequately handle two types of bitstreams. For example, it is not practical to transcode very large resolution JPEG images, because most MPEG systems have a limit on image size. A main level, high profile MPEG bitstream may be limited to a predefined size. Large resolution JPEG images may exceed the predefined size. The present invention may limit the amount of storage to a physical output size of a video buffer, along with other simplifications aimed at accelerating the decoding process. The present invention may process large progressive mode JPEG pictures and transcode the progressive JPEG bitstream into an MPEG compliant bitstream. The processing of the progressive mode JPEG pictures and the transcoding of the progressive JPEG bitstream into an MPEG compliant bitstream will be discussed in more detail in connection with FIGS. 5-12.

Figure 5:
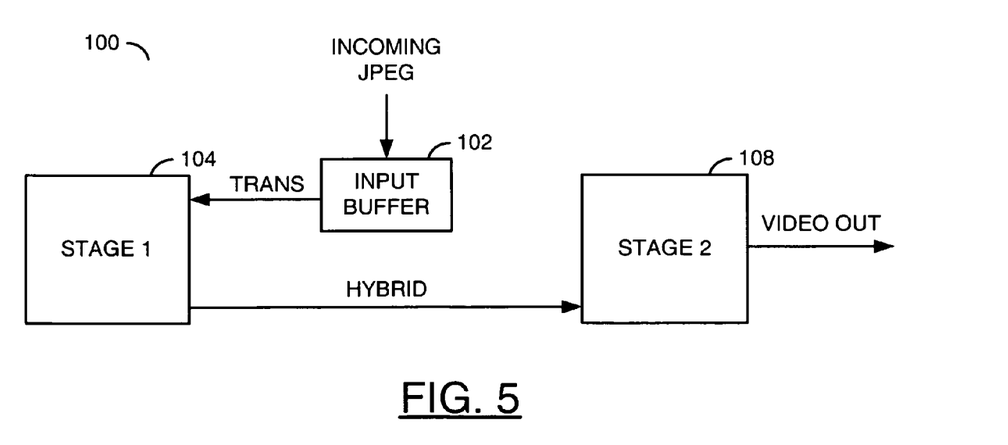
FIG. 5 is a block diagram of a system in accordance with the present invention.

Referring to FIG. 5, a block diagram of a system 100 in accordance with a preferred embodiment of the present invention is shown. The system (or apparatus) 100 generally comprises a block (or circuit) 102, a block (or circuit) 104, and a block (or circuit) 108. An input bitstream (e.g., INCOMING JPEG) may be received by the circuit 102. The circuit 102 may present a signal (e.g., TRANS) to the circuit 104. An intermediate bitstream (e.g., HYBRID) may be generated by the circuit 104 and transferred to the circuit 108. An output signal (e.g., VIDEO OUT) may be generated and presented by the circuit 108.

The circuit 102 may be implemented as an input buffer. The circuit 102 may be operational to temporarily store each of the transfers (e.g., DC1, DC2, AC1, AC2, AC3, AC4 and AC5) received in the bitstream INCOMING JPEG. The transfers may be sent to the circuit 104 in the signal TRANS. The circuit 102 may be sized smaller than the entire picture carried in the bitstream INCOMING JPEG.

The circuit 104 may be implemented as a parsing stage (e.g., stage 1). The circuit 104 may be operational to generate the bitstream HYBRID by parsing the transfers received through the circuit 102 in the bitstream INCOMING JPEG. In one embodiment, the circuit 104 may be a process running on a processor or application specific hardware. In another embodiment, the circuit 104 may be a dedicated processor or application specific hardware.

The circuit 108 may be implemented as a decoding stage (e.g., stage 2). The circuit 108 may be operational to decode the bitstream HYBRID to recreate the picture in the signal VIDEO OUT. The circuit 108 may also be operational to scale the picture in the signal VIDEO OUT to be smaller than the picture carried in the bitstream INCOMING JPEG. In one embodiment, the circuit 108 may be a process running on a processor. In another embodiment, the circuit 108 may be a dedicated processor or application specific hardware.

The circuit 104 may utilize linear properties of the IDCT to create the bitstream HYBRID by parsing the bitstream INCOMING JPEG. Such linear properties may be demonstrated by equations 4 and 5 as follows:

$$T(v1+v2)=T(v1)+T(v2) \qquad \text{Eq. 4}$$

$$T(\alpha v)=\alpha T(v) \qquad \text{Eq. 5}$$

The linear property of the IDCT generally enables the circuit 104 to create an encoded frame for each of the transfers received from the circuit 102 via the signal TRANS. For example, if a picture is encoded in the bitstream INCOMING JPEG in the progressive mode with 7 transfers, the circuit 104 may generate 7 encoded frames in 7 processing passes. In another example, the circuit 104 may convert a single large JPEG image into a single encoded frame.

Using such linear property characteristics, the progressive mode coefficients in the encoded frames may be parsed to create intermediate images in the bitstream HYBRID. The intermediate images may be added together in the circuit 108 to reconstruct the picture. The addition may be similar to an MPEG-2 prediction refinement where a prediction may be added to a decimated image. The predictions may limit an amount of memory utilized in an output display buffer of the circuit 108. After all of the intermediate images have combined to recreate the picture the circuit 108 may present the recreated picture in the signal VIDEO OUT.

Figure 6:
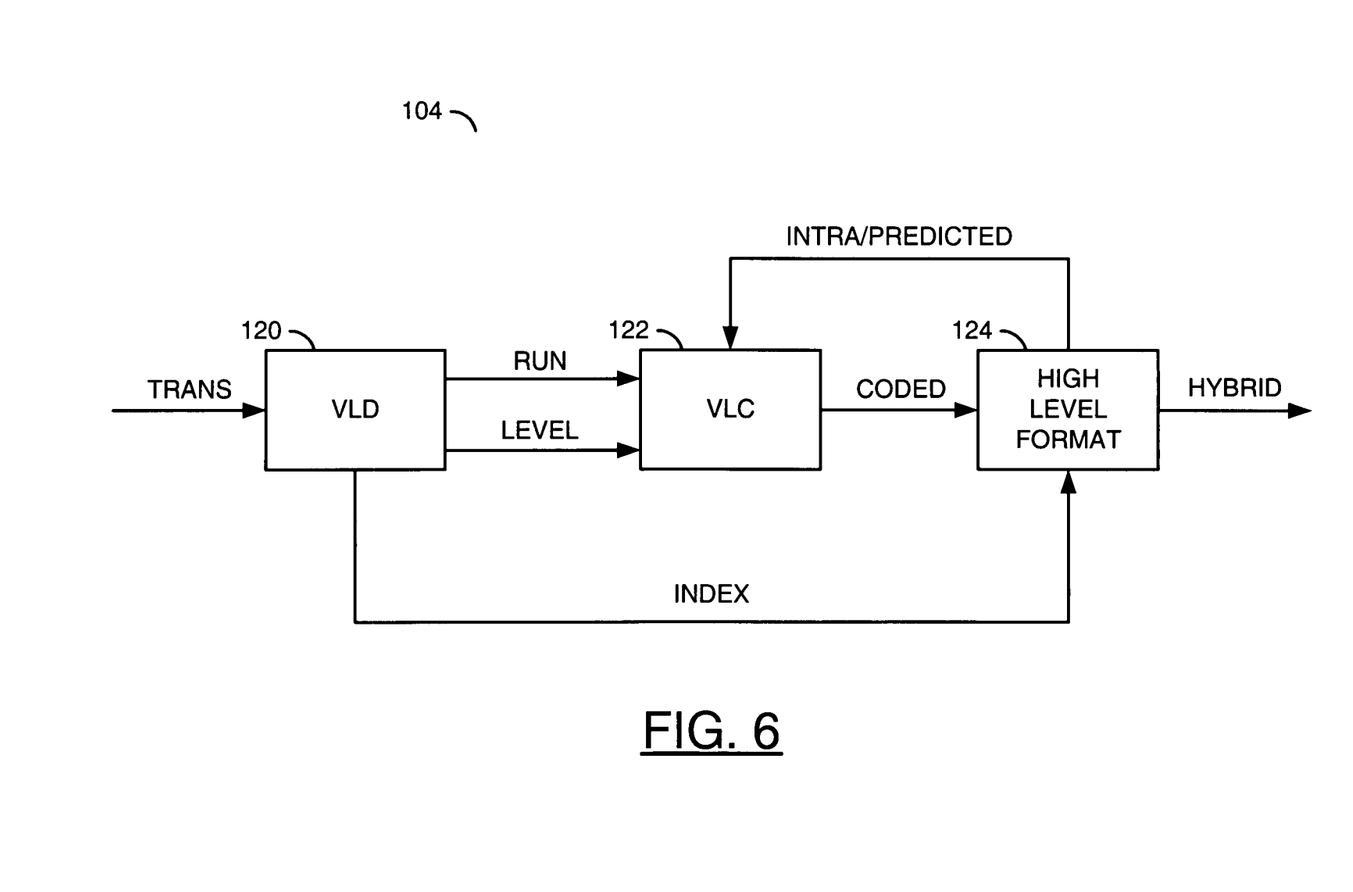
FIG. 6 is a first functional block diagram of a parsing circuit.

Referring to FIG. 6, a functional block diagram of the circuit 104 is shown. The first diagram generally illustrates a case where the input JPEG stream is progressive and proper display size. The case may be used to illustrate a transcoding operation which does not involve decoding (e.g., no IDCT) or encoding (e.g., no DCT).

The circuit 104 generally comprises a step (or block) 120, a step (or block) 122 and a step (or block) 124. The step 120 may receive the signal TRANS. A signal (e.g., RUN) may be generated by the step 120 and presented to the step 122. A signal (e.g., LEVEL) may also be generated by the step 120 and presented to the step 122. The step 120 may generate a signal (e.g., INDEX) transferred to the step 124. The step 124 may generate the bitstream HYBRID. A signal (e.g., INTRA/PREDICTED) may also be generated by the step 124 and presented to the step 122.

The step 120 generally implements a variable length decoding (VLD) operation. A progressive JPEG bitstream may be decoded by the step 120. The step 120 may generate the tokens (e.g., run, level) associated with each JPEG IDCT codeword. The run token may be transferred to the step 122 in the signal RUN. The length token may be presented to the step 122 in the signal LENGTH. In addition, the step 120 generally produces an index describing a state in a progressive decode state machine. When the progressive bitstream uses a bit-plane hierarchy, the step 120 may pad the unavailable bits as zero. For example, if a first level in the hierarchy contains a "DC1" code (see FIG. 4) and a binary pattern "101 0000 11111" (corresponding to hexadecimal 0x50F), the level output from the VLD may be the binary pattern "1010 0001 1110" (hexadecimal value 0xA1E).

The step 122 may implement a variable length coding (VLC) operation. The step 122 generally generates the signal CODED based on the signal RUN and the signal LENGTH as controlled by the signal INTRA/PREDICTION. The coding is generally based on a number of coding tables.

The step 124 generally implements a high level formatting operation. The step 124 may use the hierarchy index information received in the signal INDEX in order to create an MPEG-like bitstream from the signal CODED. A first level in the hierarchy may be translated as an MPEG-like intra (I) frame and the rest of the levels are translated as MPEG-like predicted (P) frames. The step 124 may control the step 122 so that a proper VLC table is selected in generating the signal CODED. Referring again to FIG. 4, an example progressive bitstream may be described as an MPEG-like sequence of several (e.g., 5) frames. The scanned coefficient blocks DC1 and AC1 (appropriately zero-padded) in each block may form the I-frame. A next P-frame may be formed by scanned blocks containing DC2 and AC2, and so on.

Figure 7:
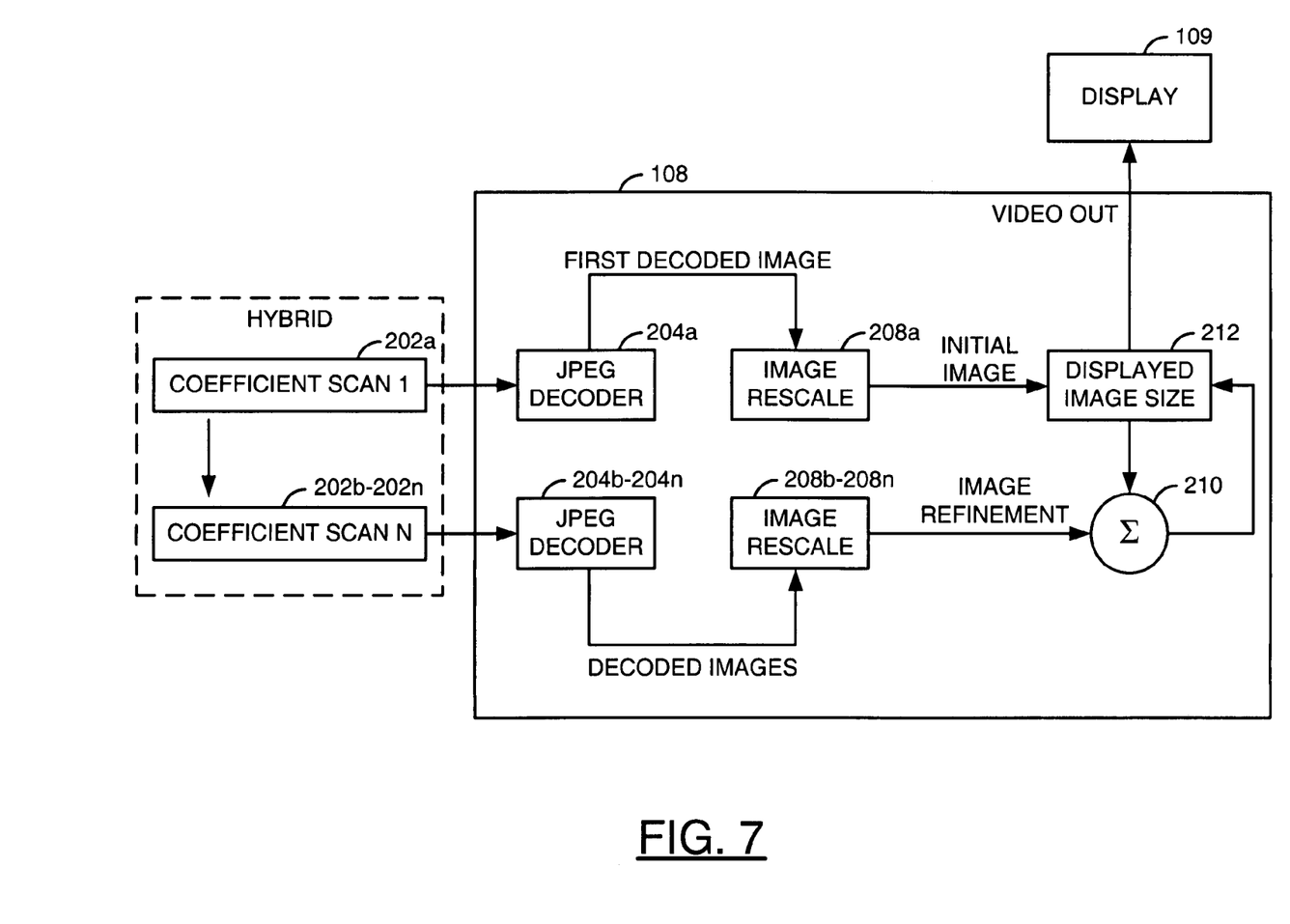
FIG. 7 is a functional block diagram of a first decoder circuit.

Referring to FIG. 7, a functional block diagram of the circuit 108 is shown. A function of the circuit 108 generally comprises multiple steps (or blocks) 204a-204n, optional multiple steps (or blocks) 208a-208n, a step (or block) 210 and a step (or block) 212. The intermediate bitstream HYBRID generally comprises a sequence of one or more coefficient scans 202a-202n that make up one or more encoded frames.

Each of the steps 204a-204n may be implemented as a decoder step. Each of the steps 208a-208n may be implemented as an image rescaling step. The step 210 may be implemented as an adder step. The step 212 may be implemented as a buffer step.

The step 204a may generate a first decoded image by decoding the coefficient scan 1 (e.g., a first encoded frame). The step 208a may rescale (e.g., downscale) the first decoded image to generate an initial scaled image. The initial scaled image may be buffered in the step 212.

The step 204b may generate a second decoded image by decoding the coefficient scan 2 (e.g., a second encoded frame). The step 208b may rescale (e.g., downscale) the second decoded image to generate a second scaled image (e.g., an image refinement). In the step 210, the initial scaled image may be added to the second scaled image to generate and updated image. The updated image may be buffered in place of the initial scaled image in the step 212.

The sequence of decoding, resealing, adding and buffering may be repeated in the steps 204c-204n, 208c-208n, 210 and 212 for the coefficient scan C through the coefficient scan N. As each image refinement is generated (e.g., a third scaled image through an Nth scaled image) and added to the buffered image, a scaled representation of the original picture may be built up in the updated image. The final updated image may present the reconstructed picture in the signal VIDEO OUT. A display 109 may generate a visual display of the final updated image in the signal VIDEO OUT.

Figure 8:
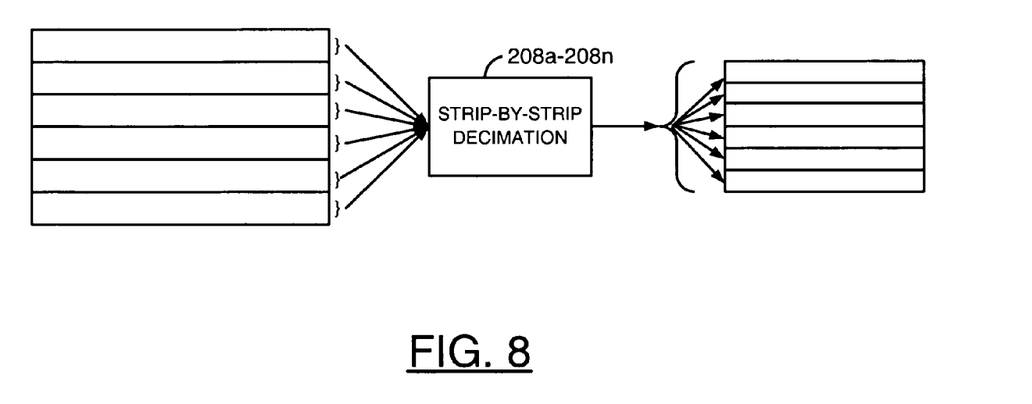
FIG. 8 is a block diagram of a decimation operation.

Referring to FIG. 8, a block diagram of a decimation operation is shown. The decimation operation (or method) may be implemented in each of the steps 208a-208n. To further save memory space, the decimation method may decimate the decoded images generated by the steps 204a-204n. The decimation may be performed in a strip-by-strip fashion. Each strip in the decoded images may start with a predetermined width and a predetermined height. After decimation, each strip may have a reduced width (less than the predetermined width) and a reduced height (less than the predetermined height). By decimating (scaling down) the decoded images after the decoding steps 204a-204n, a memory implementing the buffering step 212 may have a smaller capacity than the total size of the original picture in the bitstream INCOMING JPEG. As such, the overall buffering criteria for decoding the progressive mode JPEG picture may be less than in conventional approaches.

The present invention may be applicable in cases where the system incorporates a hardware IDCT unit and some other type of bitstream parser, but may lack a dedicated JPEG parser. For example, many DVD players may have an MPEG-2 decoder with an internal IDCT capability and yet lack a hardware JPEG decoder. The present invention may also include a technique for decoding large JPEG pictures with the progressive mode syntax using a limited amount of video memory (e.g., buffer 212).

The video memory size is generally smaller than the picture size may indicate due to the rescaling/decimating. For example, for a given picture size (e.g., A×B pixels) and a particular video memory size (e.g., C×D pixels), where C<A and D<B, the following operations may be performed. A horizontal row of macroblocks may be decoded and stripped, resulting in a temporary image strip of A×16 pixels. The temporary image strip may be decimated horizontally to a width of C pixels and stored in a video memory of the width C. A number of lines resulting from vertical decimation may depend on the resealing factor D/B. As each new row is decoded, more lines may be added to the video memory until the initial scaled image is assembled. When a progressive update of the initial scaled image (and subsequent updated images) is made using a P-frame like syntax, each of the new strips within the progressive update may be rescaled and added to the corresponding macroblock in the video memory.

Figure 9:
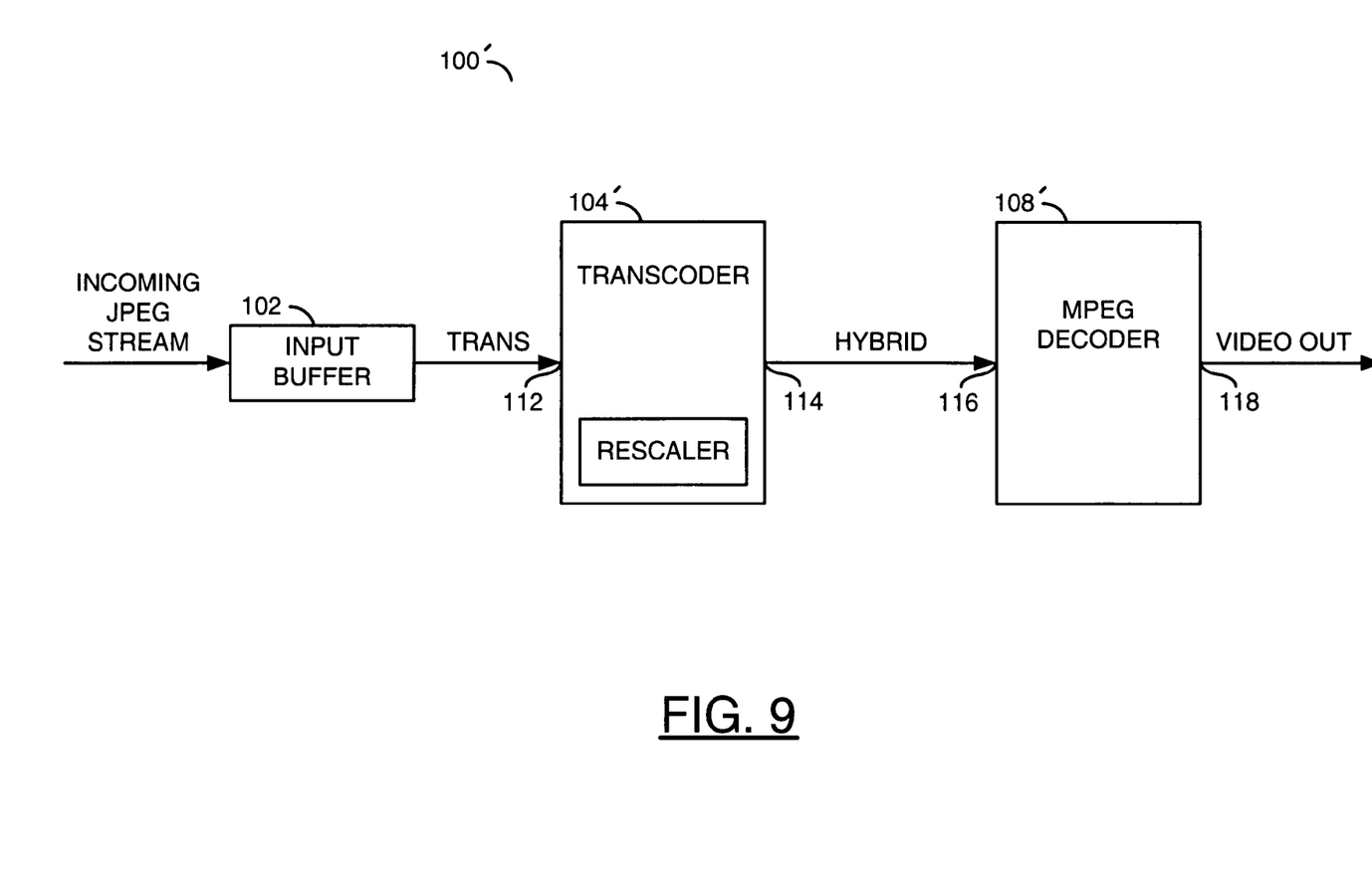
FIG. 9 is a block diagram of a second embodiment of the system.

Referring to FIG. 9, a block diagram of a second embodiment of the system 100' is shown. The system 100' generally comprises the block (or circuit) 102, a block (or circuit) 104', a block (or circuit) 108' and a block (or circuit) 110. The circuit 102 may receive the bitstream INCOMING JPEG. The signal TRANS may be transferred from the circuit 102 to an interface 112 of the circuit 104'. The bitstream HYBRID may be generated by the circuit 104' and presented from an output 114 to and input 116 of the circuit 108'. The circuit 108' may generate the signal VIDEO OUT at an interface 118. The circuit 110 may be implemented as a sub-circuit within the circuit 104 (as shown) or as a separate circuit.

The circuit 104' may be implemented as a transcoder circuit. The circuit 104' may be operational to transcode the picture data received in the signal TRANS with a progressive mode JPEG syntax/semantics into the signal HYBRID with an MPEG syntax/semantics. The circuit 104' may be implemented similar to the circuit 104. In a first functional block diagram for the circuit 104' (see FIG. 6 with 104 replaced by 104'), the formatting performed by the circuit 124 may be compliant with a standard format.

The circuit 108' may be implemented as an MPEG decoder. The circuit 108' may be operational to decode the encoded frames within the bitstream HYBRID to generate the signal VIDEO OUT. The decoding may be in accordance with an MPEG-1 standard, an MPEG-2 standard, an MPEG-4 standard, an H.261 standard, an H.263 standard and/or and H.264 standard.

The circuit 110 may be implemented as a rescaler circuit. The circuit 110 may be operational to downscale or decimate the encoded frames within the signal HYBRID to a smaller size than the picture in the bitstream INCOMING JPEG. The reduced size frames in the signal HYBRID may make the signal HYBRID compliant with the particular decoding standard of the circuit 108', whereas the picture in the bitstream INCOMING JPEG may be too large for the particular decoding standard.

The progressive mode JPEG bitstream INCOMING JPEG generally has a hierarchical ordering, where lower frequency DCT coefficients and/or higher significant digits of the DCT coefficients may appear earlier in the bitstream. Such hierarchical ordering may produce a rougher but recognizable image with the smallest number of bits. A straightforward transcoding approach of the progressive JPEG bitstream may implement sufficient memory (e.g., the circuit 102) to buffer all of the DCT coefficients at the input resolution. However, buffering of all DCT coefficients may be expensive for large resolution pictures. Instead, the circuit 104' may transcode the coefficients and the bit-planes into an MPEG (intra) I-frame and multiple (predicted) P-frames with null motion vectors in successive passes. The P-frames may be added in sequence to the I-frame by the circuit 108'.

The circuit 104' may use the linearity of filtering and IDCT operations to reorder the order of IDCT and filtering (resampling) operations. Such a reordering process may not hold true for bit planes because quantization is nonlinear. For moderate levels of quantization that may be expected in a JPEG picture, the distortion introduced via reordering may be negligible.

In general, the system 100' may perform transcoding of progressive JPEG pictures by processing different levels of the hierarchy ordering in the bitstream INCOMING JPEG. The system 100' may process the first level in the hierarchy, by resampling if applicable. The output may be an MPEG I-frame at a predetermined output resolution.

For each additional pass, the system 100' may form an MPEG P-frame by processing the pass (e.g., the next level of hierarchy) in a manner similar to processing of the first level. In one example, the second level in the hierarchy may be (i) transcoded by the circuit 104', (ii) rescaled by the circuit 110 and (iii) presented in an MPEG bitstream (e.g., the bitstream HYBRID). Instead of using the MPEG I-frame syntax, the MPEG P-frame syntax may be used for the second level and beyond. In the MPEP P-frames, each macroblock may have a zero (e.g., null) motion vector and a residual error carried in the P-frames may be new information added by the pass. The transcoding process may be repeated as long as significantly new information is added by the P-frames. The process may stop when either the input bitstream INCOMING JPEG ends or minimal residual error information remains after resealing.

In general, the circuit 110 may optionally rescale large progressive JPEG streams into smaller progressive JPEG streams to allow the system 100' to perform the MPEG decoding. The MPEG bitstream may be bounded by a maximum output resolution. For example, a standard high-definition television (HDTV) size of 1920×1080 pixels may be selected as the maximum output size. When the input size (e.g., the size of the JPEG picture) is larger than the HDTV maximum output size, the transcoding operation may include the resealing.

The resealing may reduce large progressive JPEG pictures via two options. In a first option, downscaling may be performed while transcoding. The first option may allow for faster performance and a lower memory. A lower resolution IDCT (e.g., 4×4 and/or 2×2) may be used to reduce the image size by a factor of 2 or 4. In one example, an 8×8 DCT block that is decoded using a reduced resolution IDCT may provide a rescaled 4×4 block. The decoding process that uses a reduces resolution IDCT may reduce the image resolution by a power of 2, (e.g., reduced by a factor of 2, 4, or 8). For example, if the input image is 2560×1440 pixels, and the maximum output size is 1920×1080 pixels, a 4×4 IDCT may obtain an output size of 1280×720 pixels.

In a second option, a slice of blocks may be decoded, where the slice is defined as the number of horizontal stripes of macroblocks. This slice may use an intermediate slice buffer. After the slice is decoded, the slice is filtered by a polyphase filter (not shown) to obtain the desired size. For example, an intermediate buffer of 2560×32 pixels may be used and after decoding a slice of 2560×16 pixels or one row of macroblocks, the circuit 110 may use a 4:3 decimation ratio to obtain an output of 1920 pixels wide. The decoding and resealing may continue and when the entire image is processed, an output of 1920×1080 pixels may be produced.

In the example as illustrated in connection with the second option, both the input and the output may have a 16:9 aspect ratio. The 16:9 aspect ratio is more common for HDTV displays, while JPEG images may have a 4:3 aspect ratio. With JPEG images that have a 4:3 aspect ratio, more processing may be performed. For example, additional processing may include cropping the top and bottom portions of the input to obtain a 16:9 center window and/or displaying the 4:3 picture in its entirety by inserting black mats at the left and right of the picture. Such a choice between cropping or displaying may result in a resampling ratio that is computed by the ratio of the heights or by the ratio of the widths. For cropping, the resampling factor=output_width/input_width. For black-matting, the resampling factor=output_height/input height.

When the resampling process generates a row of macroblocks at an output resolution, the row of macroblocks may be encoded into MPEG and the buffer may be reused. Such a method may use an output buffer of one row of macroblocks at the output width. Each output macroblock may be coded as an intra type MPEG macroblock.

In general, the bitstream HYBRID may be generated using a transformation scheme. The transformation scheme may make the bitstream HYBRID suitable for decoding by a motion-compensated, DCT-based standard (e.g., the MPEG decoder 108') or one or more motion-video compression standards. The bitstream HYBRID may resemble a fully or partially compliant bitstream to the designated motion-compensated, DCT-based standard. The bitstream HYBRID may also resemble a stream of run-length coded coefficients that matches a designated standard.

Figure 10:
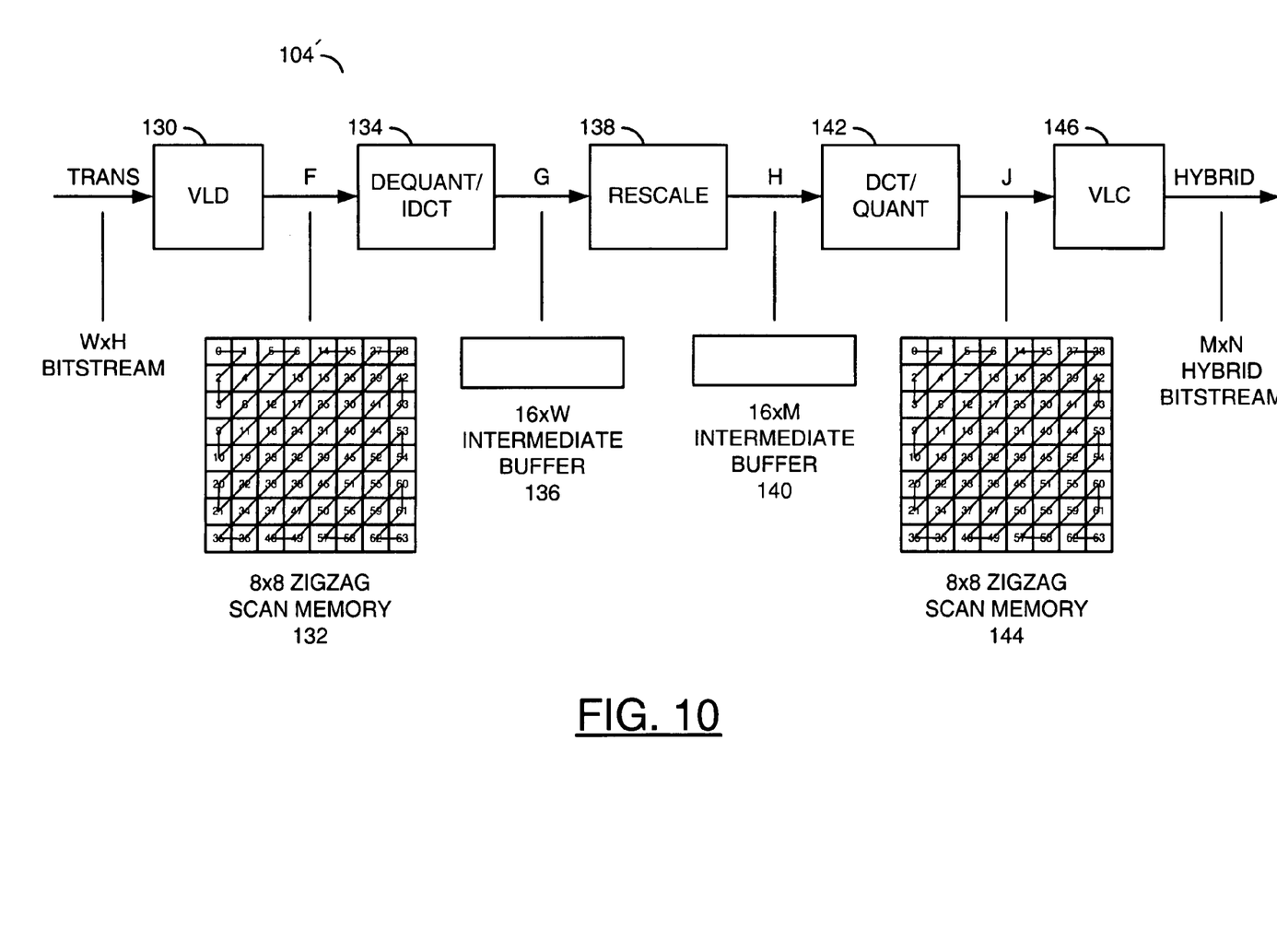
FIG. 10 is a second functional block diagram of the parsing circuit.

Referring to FIG. 10, a second functional block diagram of the circuit 104' is shown. The second diagram generally illustrates a case where the bitstream is larger than a target display size and is not a progressive stream. The case may be used to illustrate a resealing operation without the complications of a progressive decode.

The circuit 104' generally comprises a step (or block) 130, a step (or block) 132, a step (or block) 134, a step (or block) 136, a step (or block) 138, a step (or block) 140, a step (or block) 142, a step (or block) 144 and a step (or block) 146. The step 130 may receive the signal TRANS. A signal (e.g., F) may be generated by the step 130 and presented to the step 134. A signal (e.g., G) may be generated by the step 134 and presented to the step 138. The step 138 may generate a signal (e.g., H) for use by the step 142. A signal (e.g., J) may be generated by the step 142 and presented to the step 146.

The step 130 may be implemented as a variable length decoding operation. The data in the signal TRANS is generally parsed by the step 130 to generate the signal F. The parsed data block in the signal F may fill the 8×8 zigzag scan memory 132.

The step 134 may implement an inverse quantization (DE-QUANT) operation and an IDCT operation. The parsed data block in the memory 132 may be inverse quantized and processed with the IDCT operation resulting in 8×8 pixel macroblock in the signal G. The macroblock may be buffered in the intermediate buffer 136. Each macroblock may be decoded in the same manner resulting in a strip of (i) 16×W luminance pixels and (ii) either 16×W chrominance pixels, if the input is in the 4:4:4 format or 16×(W/2) chrominance pixels, if the input is the 4:2:2 format. If the decode engine (e.g., circuit 108') supports variable chroma format, the chrominance information may remain as-is. If the decode engine only supports the 4:2:2 format or the 4:2:0 format, the chrominance may be scaled differently from luminance.

The step 138 may be implemented as a resealing operation. After a row of macroblocks is decoded, the row may be processed by the step 138 to generate the signal H. The step 138 may perform an initial horizontal decimation followed by a vertical decimation. Depending on the vertical resealing factor and the number of taps used implementing the step 138, a variable number of lines may be produced in the signal H for each input strip of 16×W lines. The lines in the signal H are generally accumulated in the buffer 140. The buffer 140 may be sized to store 16×M pixels, where M is either the output width or the maximum width that the circuit 108' may handle. Because of filtering, some embodiments may implement the buffer 140 to hold 32×M pixels.

The step 142 may implement a DCT operation and a quantization (QUANT) operation. The step 146 may be implemented as a variable length coding operation. The zigzag scan memory 144 may buffer the information in the signal J between the step 142 and the step 146. When at least several (e.g., 16) lines have been buffered, the 16×M block may be processed by the DCT step and the VLC step to form an MPEG slice, containing a row of MPEG macroblocks, in the bitstream HYBRID.

Figure 11:
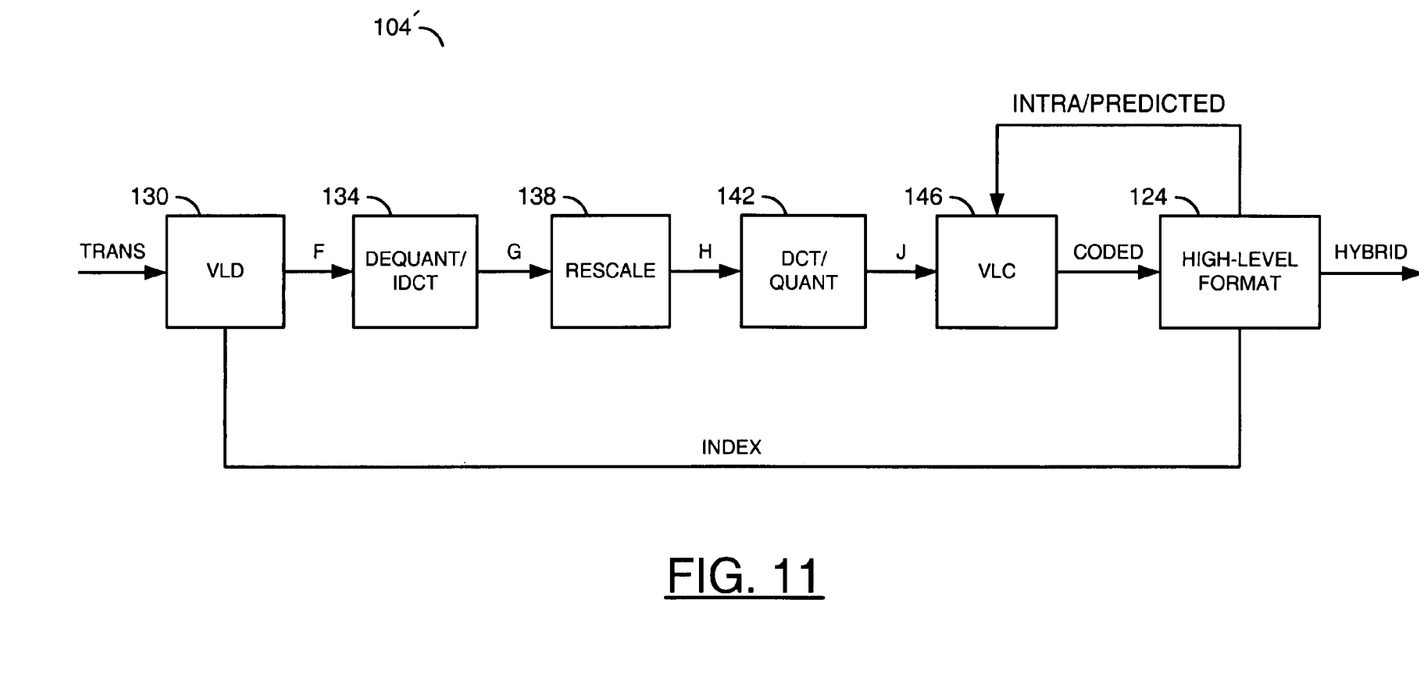
FIG. 11 is a third functional block diagram of the parsing circuit.

Referring to FIG. 11, a third functional block diagram of the circuit 104' is shown. The third diagram generally illustrates a case combining the first diagram (FIG. 6) and the second diagram (FIG. 10).

The circuit 104' generally comprises the step 130, the step 134, the step 138, the step 142, the step 146 and the step 124. The buffers and memories 132, 136, 140 and 144 are generally not shown for clarity. The step 130 may be further operational to generate the signal INDEX. The step 146 may be further operational to generate the signal CODED as controlled by the signal INTRA/PREDICTED.

Figure 12:
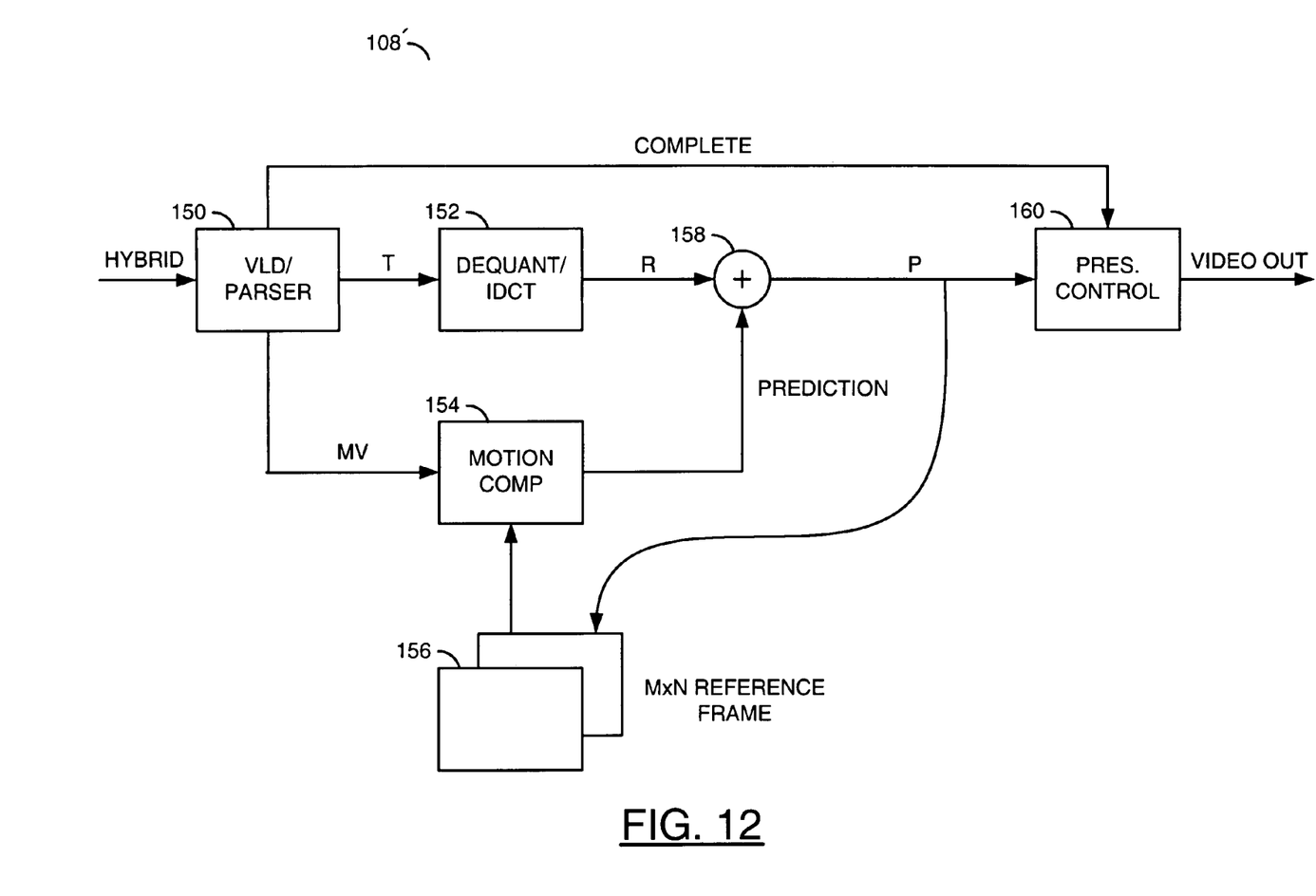
FIG. 12 is a functional block diagram of a second decoder circuit.

Referring to FIG. 12, a functional block diagram of the circuit 108' is shown. The diagram generally illustrates a case similar to a standard MPEG decoder, except for an additional block (e.g., Presentation Control) and an extended VLD parser. The circuit 108' generally comprises a step (or block) 150, a step (or block) 152, a step (or block) 154, a step (or block) 156, a step (or block) 158 and a step (or block) 160. The step 150 may receive the bitstream HYBRID. A signal (e.g., COMPLETE) may be generated by the step 150 and presented to the step 160. The step 160 may generate the signal VIDEO OUT. A signal (e.g., T) may be generated by the step 150 and presented to the step 152. A signal (e.g., MV) may be generated by the step 150 and presented to the step 154. The step 152 may generate a signal (e.g., R) for use by the step 158. A signal (e.g., P) may be generated by the step 150 and presented to the step 160 and the step 156. A signal (e.g., PREDICTION) may be generated by the step 154 and presented to the step 158.

A progressive JPEG bitstream may be transcoded by the circuit 104' as a single I-frames followed by a number of P-frames. An end of a picture in the bitstream HYBRID may be signaled by the circuit 104' by a number of ways. For example, a special end code, such as "sequence_end_code", or 0x1B7 may be inserted in the bitstream HYBRID.

The step 150 may implement a VLD operation and a parser operation. The step 150 generally extracts intra macroblocks and residual macroblocks from the bitstream HYBRID. The macroblocks may be presented in the signal T to the step 152. The step 150 may also extract motion vectors for the macroblocks from the bitstream HYBRID. The motion vectors may be presented in the signal MV to the step 154. The parser operation of the step 150 may assert the signal COMPLETE upon detection of a last P-frame in the JPEG hierarchy.

The step 152 may implement an inverse quantization operation and an IDCT operation on the macroblocks. If the macroblocks are residual macroblocks, the transformed residual macroblocks may be presented in the signal P to the step 158. The step 154 may implement a motion compensation operation. The step 154 may generate motion compensated reference pictures using the motion vectors received in the signal MV and reference frames buffered in the reference frame memory step 158. The step 158 may implement an adder operation. The step 158 generally adds the decoded residual macroblocks to the motion compensated reference blocks to form reconstructed macroblocks in the signal P. The reconstructed macroblocks may be stored in the step 156 for use as new reference pictures.

The step 160 may implement a presentation control operation. The step 160 may be configured so that only a final result image may be displayed when the end of bitstream has been seen by the step 150. Until an initial image has been decoded, the step 160 may present a blank picture in the signal VIDEO OUT. Upon assertion of the signal COMPLETE, the step 160 may present the fully reconstructed image in the signal VIDEO OUT. Furthermore, the step 160 may hold a current image in the signal VIDEO OUT while a next image is being decoded. Otherwise, each level in the JPEG hierarchy may be presented as a video frame, showing the gradual refinement as more P-frames are decoded.

Figure 13:
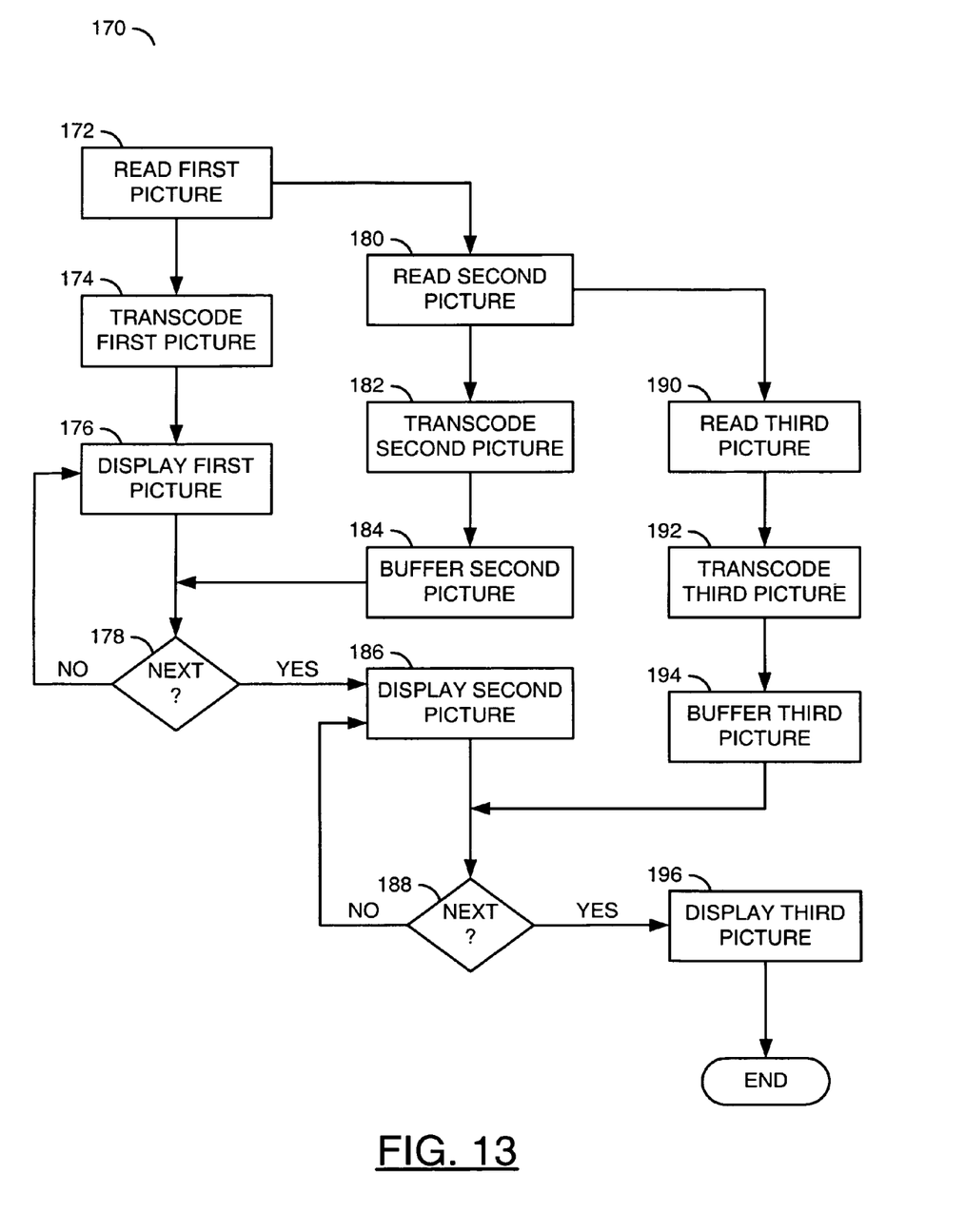
FIG. 13 is a flow diagram of an example method for browsing pictures in a media.

Referring to FIG. 13, a flow diagram of an example method 170 for browsing pictures in a media is shown. The method (or process) 170 may implement a browsing operation. The method 170 generally comprises a step (or block) 172, a step (or block) 174, a step (or block) 176, a step (or block) 178, a step (or block) 180, a step (or block) 182, a step (or block) 184, a step (or block) 186, a step (or block) 188, a step (or block) 190, a step (or block) 192, a step (or block) 194 and a step (or block) 196.

In practice, the user may insert a media containing JPEG images into a system to browse the pictures. At a step 172, a first picture may be read from the media. In a first thread, the first picture may be transcoded into the MPEG/H.26x format in the step 174 and displayed in the step 176.

While the user is looking at the first picture, the system may start a second thread by reading a second picture from the media in the step 180. The step 180 may be performed substantially simultaneously with the step 174. The second picture is generally transcoded in the step 182 and the transcoded hybrid bitstream may be stored in a non-volatile storage in the step 184, such as a hard disk drive or optical writeable media and/or cached in volatile storage such as RAM. The steps 182 and 184 may be performed in parallel with the step 176 (and possibly a last part of step 174). If the user decides to continue viewing the first picture (e.g., the NO branch of step 178), a first thread of the method remains at the step 176. It the user decides to move to the next picture (e.g., the YES branch of step 178), the method may continue with the step 186. In the step 186, the second picture may be quickly displayed.

After the second picture has been read from the media, the method may begin a third thread by reading a third picture from the media in the step 190. The third picture may be subsequently transcoded in the step 192 and buffered in the step 194. The third thread may be performed substantially simultaneously with the first thread and/or the second thread after a delayed start. If the user decides to remain at the second picture (e.g., the NO branch of step 188), the method may continue displaying the second picture in the step 186. If the user decides to move to the next picture (e.g., the YES branch of step 188), the method may quickly display the third picture in the step 196.

Any additional pictures present in the media may be read in turn, transcoded and then buffered while previously-read pictures are being processed and displayed. When the user goes on to the next image, the next image may already have been transcoded, and may be shown very quickly.

The present invention may provide a system for decoding a progressive JPEG stream. The progressive JPEG stream may be decoded as a sequence of predicted video frames represented via the hybrid stream. The transformation of the JPEG stream into a hybrid predicted video stream may adapt the overall decoding process to become better suited for an embedded MPEG decoding processor. In addition, the memory guidelines for decoding progressive JPEG images may be bounded to the video display device instead of the resolution of the incoming JPEG bitstream.

The hybrid bitstream may be generally in an MPEG format suitable for decoding by an MPEG decoder. The hybrid bitstream may have non-MPEG high level syntax with JPEG high-level information and MPEG syntax block level information. Since block-level processing may be time-consuming, the inclusion of non-MPEG high level syntax with JPEG high-level information and MPEG syntax block level information generally results in faster decoding.

The present invention may perform transcoding in parallel with decoding. The parallel process may increase a system throughput. In one example, the parallel processing may performed with a multi-processor system. The present invention may be perform transcoding independently of a decoding. Such independent transcoding may increase a decoding speed. For example, when a media containing JPEG files is visible, the present invention may transcode all JPEG bitstreams into MPEG bitstreams. When the user requests to decode a JPEG file, the corresponding MPEG bitstream may be decoded much more quickly.

The present invention is generally useful in system with a hardware MPEG decoder and no acceleration hardware for JPEG decoding. Such systems may include, but are not limited to, a DVD decoders and/or Bluray decoders with optical drives. The present invention may also be useful in systems having other means for importing JPEG bitstreams such as a USB port, a removable media interface such as memory stick, and the like.

The function performed by the diagrams of FIGS. 5-13 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a first circuit configured to generate an intermediate bitstream by transcoding an input bitstream carrying a picture, wherein
   (i) said input bitstream comprises a Joint Picture Expert Group (JPEG) bitstream,
   (ii) said picture is represented by a plurality of discrete cosine transform coefficients in said input bitstream,
   (iii) said discrete cosine transform coefficients form at least five bit-planes,
   (iv) said intermediate bitstream comprises a Motion Picture Expert Group (MPEG) bitstream,
   (v) said intermediate bitstream includes at least five encoded frames arranged in a sequence of one intra-frame followed by at least four consecutive predicted-frames and
   (vi) each of said encoded frames represents a different subset of said bit-planes; and
   a second circuit configured to
   (i) generate a plurality of decoded images by decoding said encoded frames of said intermediate bitstream in said sequence and
   (ii) recreate said picture by adding said decoded images to each other to rejoin said subsets of said bit-planes, wherein each of said decoded images when added increases a respective resolution of each one of a plurality of pixel values in said picture.

2. The apparatus according to claim 1, wherein said input bitstream comprises a progressive mode JPEG bitstream that gradually refines said picture in many passes.

3. The apparatus according to claim 1, wherein said first circuit comprises a JPEG-to-MPEG transcoder.

4. The apparatus according to claim 1, wherein
   (i) a first of said encoded frames comprises an MPEG intra-frame carrying a plurality of most significant bits of index of coefficients of said discrete cosine transform coefficients and
   (ii) said second circuit comprises an MPEG decoder modified to rejoin said subsets of said bit-planes.

5. The apparatus according to claim 4, wherein
   (i) a second of said encoded frames comprise an MPEG predicted-frame and
   (ii) each of a plurality of macroblocks in said MPEG predicted-frame has a null motion vector that points to said MPEG intra-frame.

6. The apparatus according to claim 1, wherein said second circuit is further configured to generate a plurality of scaled images by spatially scaling down said decoded images.

7. The apparatus according to claim 6, wherein
   (i) said second circuit further comprises a memory configured to buffer a first of said scaled images and
   (ii) a first size of said memory is less than a second size of said picture.

8. The apparatus according to claim 7, wherein said second circuit is further configured to
   (i) generate an updated image by adding said first scaled image to a second of said scaled images and
   (ii) store said updated image in said memory.

9. The apparatus according to claim 7, wherein said second circuit is further configured to generate said scaled images by spatially decimating a plurality of rows in said decoded images, one of said rows at a time.

10. The apparatus according to claim 9, wherein said second circuit is further configured to generate an updated image by adding said first scaled image to a second of said scaled images, one of said rows at a time.

11. The apparatus according to claim 1, further comprising a third circuit configured to display said picture.

12. The apparatus according to claim 11, wherein said second circuit is further configured to withhold said decoded images from said third circuit while adding said decoded images.

13. A method for decoding a picture, comprising the steps of:
   (A) generating an intermediate bitstream by transcoding an input bitstream carrying said picture, wherein
   (i) said input bitstream comprises a Joint Picture Expert Group (JPEG) bitstream
   (ii) said picture is represented by a plurality of discrete cosine transform coefficients in said input bitstream,
   (iii) said discrete cosine transform coefficients form at least five bit-planes,
   (iv) said intermediate bitstream comprises a Motion Picture Expert Group (MPEG) bitstream,
   (v) said intermediate bitstream includes at least five encoded frames arranged in a sequence of one intra-frame followed by at least four consecutive predicted-frames and
   (vi) each of said encoded frames represents a different subset of said bit-planes;

(B) generating a plurality of decoded images by decoding said encoded frames of said intermediate bitstream in said sequence; and (C) recreating said picture by adding said decoded images to each other to rejoin said subsets of said bit-planes, wherein each of said decoded images when added increases a respective resolution of each one of a plurality of pixel values in said picture.

14. The method according to claim 13, wherein said input bitstream comprises a progressive JPEG bitstream that gradually refines said picture in many passes.

15. The method according to claim 13, wherein said encoded frames are generated by a JPEG-to-MPEG transcoding.

16. The method according to claim 13, wherein
(i) an initial of said encoded frames comprises an MPEG intra-frame carrying a plurality of most significant bits of index coefficients of said discrete cosine transform coefficients and
(ii) said picture is recreated by an MPEG decoding modified to rejoin said subsets of said bit-planes.

17. The method according to claim 16, wherein
(i) a next of said encoded frames comprises an MPEG predicted-frame and
(ii) each of a plurality of macroblocks in said MPEG predicted-frame has a null motion vector that points to said MPEG intra-frame.

18. The method according to claim 13, further comprising the step of:
generating a plurality of scaled images by spatially scaling down said decoded images.

19. The method according to claim 18, further comprising the step of:
buffering an initial of said scaled images in a memory, wherein a first size of said memory is less than a second size of said picture.

20. The method according to claim 19, further comprising the steps of:
generating an updated image by adding said initial scaled image to a next of said scaled images; and
storing said updated image in said memory.

21. The method according to claim 19, further comprising the step of:
generating said scaled images by spatially decimating a plurality of rows in said decoded images, one of said rows at a time.

22. The method according to claim 13, further comprising the step of:
transcoding a next picture into said intermediate bitstream substantially simultaneously with generating said decoded images.

23. The method according to claim 22, further comprising the step of:
generating a plurality of next decoded images substantially simultaneously with recreating said picture.

* * * * *